Jan. 13, 1970   J. G. MATTHEWS   3,488,931
MOWING MACHINE
Filed Oct. 31, 1968
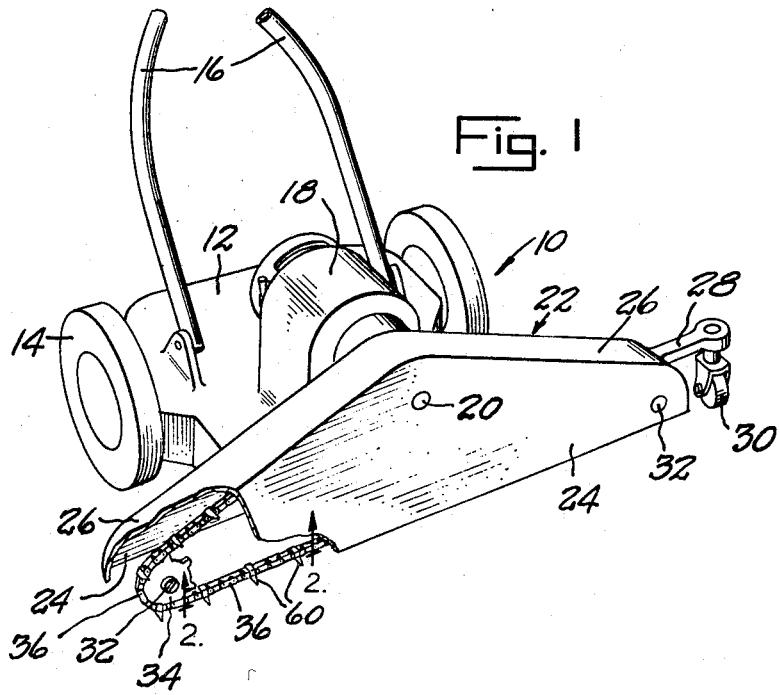
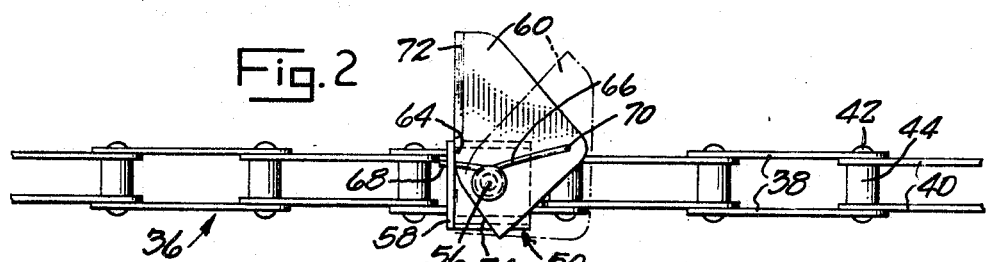
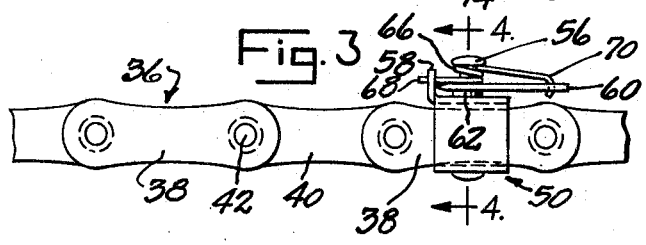
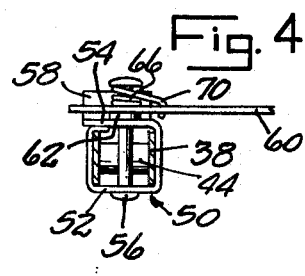
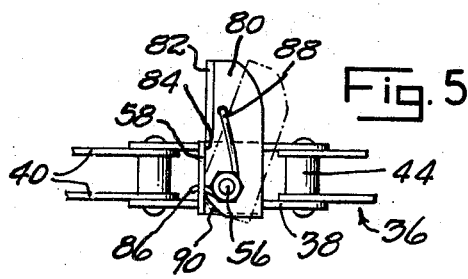
INVENTOR.
JAY G. MATTHEWS
BY
*Altieri & Knoblock*
ATTORNEYS

3,488,931
MOWING MACHINE
Jay G. Matthews, Niles, Mich.; First National Bank of Southwestern Michigan, 210 E. Main St., Niles, Mich. 49120, executor of the estate of said Jay G. Matthews, deceased
Filed Oct. 31, 1968, Ser. No. 772,091
Int. Cl. A01d 55/24
U.S. Cl. 56—25                                    5 Claims

ABSTRACT OF THE DISCLOSURE

A mower having a power driven chain travelling transversely of the path of travel of the mower and pivotally mounting cutter blades at spaced intervals, which blades normally project laterally from the chain and are spring urged toward a normal cutting position.

---

This invention relates to improvements in mowing machines.

Heretofore, mowing machines have generally been of either the reciprocating shear blade type or the type in which the cutting blades are pivotally mounted at the peripheral portion of a high speed rotor. Mowers of the shear type are expensive, heavy, awkward to use, hazardous in use, and limited as to types of terrain on which they can be used and possess other disadvantages. Mowers of the rotor mounted blade type are hazardous in use because of the high centrifugal speed of the mower blades with resultant risk of injury to bystanders and property as a result of propulsion of broken blades, stones, bones and other articles struck by the blades, and also are limited as to the width of the swath which can be cut thereby.

It is a primary object of this invention to provide a mower which overcomes the disadvantages of prior mowers, and which is simple and inexpensive in construction and highly efficient in use.

A further object is to provide a mower which can be made in any of a wide range of sizes, with small differences in components for different mower sizes.

A further object is to provide a mower having cutting elements mounted upon a chain and which are subject to vibration or chatter in use so as to be self-cleaning and to minimize the throwing of stones, bones or other objects struck thereby, and which is subject to a minimum danger of breakage of the blades and other components upon striking an obstacle.

Other objects will be apparent from the following specification.

In the drawing:

FIG. 1 is a fragmentary perspective view illustrating one embodiment of the invention with parts broken away.

FIG. 2 is an enlarged fragmentary plan view of a cutter element used in the mower.

FIG. 3 is an enlarged fragmentary side view illustrating a cutter.

FIG. 4 is a transverse sectional view taken on line 4—4 of FIG. 3.

FIG. 5 is a fragmentary plan view illustrating another form of cutter used in the mower.

The present mower utilizes a chain, trained around sprockets and driven by a high-speed motor, as a carrier for spaced cutter blades which are pivoted thereto and spring urged to a normal cutting position. The chain and its cutter and drive motor are carried by a suitable wheeled support.

The mower 10 here chosen for illustration is of the manually propelled type. It will be understood, however, that the mower may be of a power-propelled type if desired. The mower has a rigid frame or body 12 and is supported upon wheels 14 by suitable journals, (not shown). In the hand-propulsion type, as shown, the mower is provided with handle 16 by means of which it can be pushed or propelled. A suitable power member 18, such as an internal combustion engine or an electric motor, is mounted upon frame 12 and has a shaft 20 driven thereby.

Frame 12 mounts a hood or guard 22 at its forward end, the same being open at its bottom and being of a width greater than the width of the swath to be cut. The hood preferably includes spaced front and rear walls 24 and top and end walls 26 spanning the front and rear walls. Suitable positioning means may be located at or adjacent the guard 22 and will preferably be vertically adjustable to control the elevation of the guard. As here shown, such adjustable support means include laterally projecting arms 28 at opposite laterally spaced ends of the guards carrying suitable adjustable ground contacting supports 30, with means (not shown) for adjusting the position thereof vertically relative to the arms 28. As shown, the supports 30 constitute caster wheels. The motor shaft 20 projects through the guard 22 and is journalled therein.

The hood or guard 22 journals a pair of shafts 32 at opposite laterally spaced end portions thereof and a sprocket 34 is mounted upon each shaft 32. A driving sprocket, not shown, is mounted upon the driving shaft 20. A chain 36 is trained around the sprockets. The lower run of the chain extending between the sprockets mounted on the shafts 32 will preferably have the lowermost portions thereof at approximately the level of the bottom edge of the front housing wall 24, and this chain run will be sufficiently taut to be substantially horizontal. Any suitable means to maintain chain tension may be provided. Also substantial clearance space between the chain 36 and the front housing wall 24 must be provided. The chain will preferably be of the roller type and will be provided with pairs or sets of outer links 38 and sets of pairs of inner links 40, with adjacent ends of adjacent pairs being pivotally connected by pivot pins 42 which are encircled by roller or tubular members 44. The sprockets will preferably be of the type in which the teeth engage spaced rollers or cross-members.

At selected intervals of pre-determined spacing, and spaced from parts at which sprocket teeth engage the chain, blade mounting brackets 50 are mounted upon the chain. These brackets are preferably of the character best illustrated in FIGS. 3 and 4 and encircle pairs of chain links such as outer links 38, as at alternate sets thereof. Each bracket is preferably formed of sheet metal and extends around paired chain links, having an inner bracket run 52 and an outer bracket run 54 which are interconnected by a cross-pin 56 or rivet or other securing member. A flange 58 is bent outwardly from the outer bracket run 54 and extends transversely of the chain.

A cutter blade 60 is pivoted on each pin 56 at a part of the pin projecting or separated from the outer bracket run 54 by a spacer 62, such as a washer. Blades 60 normally extend parallel to bracket run 54. Each blade 60 has an abutment edge portion 64 which is normally urged into engagement with the adjacent bracket flange 58 by means of a torsion spring 66 which has a central portion encircling a projecting part of the pin 56. One end portion of the spring 66 projects through an opening in the adjacent bracket flange 58 at 68 and the opposite end portion of the spring at 70 defines a hook which extends through an aperture in the blade 60 spaced from the pin 56. Each torsion spring serves normally to rotate the associated blade 60 in a counterclockwise direction as viewed in FIG. 2 for the purpose of effecting abutment of the blade edge 64 with the adjacent bracket flange 58. Each blade has a cutting edge 72 at a part thereof projecting laterally and substantially perpendicularly from the chain in the normal position of the parts illustrated in FIG. 2. Each blade has an edge 74 merging with and extending at an angle to the abutment edge 64 and engageable with the adjacent bracket flange 58 to limit pivoting of the blade 60 substantially in the dotted line position illustrated in FIG. 2 against the action of the spring 66 upon contact of the blade with an abutment, such as a stone, bone or other article.

An alternate construction is illustrated in FIG. 5, wherein the chain and the cutter mounting bracket is substantially the same as that described above. In this construction, the cutter blade 80 is elongated and comparatively narrow and is pivoted at one end thereof to the pin 56. The cutting edge portion 82 of the blade 80 normally projects laterally and substantially perpendicular to the chain, its position being determined by an abutment edge 84 of the blade engaging the associated bracket flange 58 as urged by a torsion spring having one end 86 anchored to the bracket at flange 58 and having a hook end 88 anchored to the projecting part of the blade 80 adjacent to the cutting edge 82. The blade 80 has a rounded edge 90 accommodating rotation thereof about the pin 56 as seen in FIG. 5. In this instance, the parts are preferably so proportioned that substantial pivotal movement of the blade may occur and, if desired, the blade 80 may swing into substantial parallelism with the chain if it strikes an obstacle, this arrangement being provided by forming the curved edge 90 substantially concentric with the pin 56.

In the use of the device, it travels along the terrain to be mowed with the chain 36 driven at high speed by the engine or motor 18 in a direction perpendicular to the path of travel of the mower. The lower run of the chain is spaced at selected elevation above ground level determined by the nature of the terrain and the character of the growth to be cut. Thus for a grass lawn, the mower may be set from one to three inches above ground level, while in a hay field the mower may be set from three to six inches above ground level. The speed of operation of the chain may be set as desired and preferably will be in the range from 2500 to 8000 feet per minute.

The cutter blades and the mounting brackets 54 of said blades are so located that they are positioned between teeth of the sprocket as the chain passes around each sprocket, and the projecting flange 58 and the blade and the spring are all positioned outermost during travel around the sprocket. In this arrangement the blades are positioned at the bottom of the lowermost run of the chain in a mowing location and travel with their cutting edges foremost and projecting laterally from the chain. As pebbles, stones, bones or other articles or obstructions are encountered by the blades, the blades swing or pivot rearwardly. This serves to protect the blades or cutters against breakage.

Another advantage of the swinging of the blades upon encountering a pebble or stone or other object is that the force of the impact is cushioned by the spring flexure and, if the object which is struck is movable, it is moved only a comparatively short distance and with much less force than would be the case if the blades were not yielding or pivotable. The pivoting of the blades also is characterized by a chattering action, in that the blades return quickly from pivoted to normal position incident to spring action following impact with an obstacle. The return action of the spring restores the effectiveness of the cutting action of the blade so that the swinging of the blade does not materially interfere with or reduce the uniformity of the cutting action of the mower.

Another advantage of the construction is that each blade, being pivotally mounted spaced from the other blades, is readily accessible if it is broken or bent so that it may be repaired or replaced quickly and easily.

Still another important advantage of the construction is that the chattering action of the blade renders the blades self cleaning. In other words, as grass and other plants are mowed and parts thereof normally tend to adhere to the blades when cut, the chattering action produces sufficient vibration and impact of parts to dislodge accumulated material and thus maintain the cutting efficiency of the blades substantially uniform.

Another characteristic of the device, by reason of the chain mounting of the cutters and the ability to produce a carrier for the chains which may extend laterally from the wheel support, is that the mower may effectively mow steep banks, as by pivotally mounting the chain carrier relative to the wheeled support, as well understood in the art.

The invention is susceptible of numerous modifications as will be apparent to those skilled in the art and as comprehended within the scope of the appended claims.

What I claim is:

1. A mower comprising a movable frame, sprockets journalled on said frame, means for driving one sprocket, a chain trained around said sprockets and having a lower substantially horizontal run, a plurality of blades carried by said chain at spaced intervals and arranged to be substantially horizontal and at the level of the lower part of said lower run, each blade having a leading cutting edge portion projecting laterally from said chain and forwardly of the path of travel of said frame, a plurality of brackets carried by said chain and each pivotally mounting a blade, and spring means having an end connected to each bracket and an end connected to the blade pivoted to said bracket, each spring urging a blade to pre-determined position relative to its mounting bracket, said bracket, blade and spring constituting a unit removably supported by said chain.

2. A mower as defined in claim 1, wherein each bracket includes a flange against which a blade is normally pressed by said spring.

3. A mower as defined in claim 1 wherein each blade pivots on a pin which is encircled by a coil of each spring means, one end of each spring means being anchored at said bracket spaced from said pin the other end of said spring means being anchored at said blade spaced from said pin.

4. A mower as defined in claim 1 wherein each bracket encircles opposite links of the chain spaced from sprocket-tooth-engaging portions of the chain and carrying a pin pivotally mounting the blade.

5. A mower as defined in claim 1, wherein each spring includes a central coiled part and spaced end parts projecting laterally from said coil and respectively connected to said bracket and blade.

References Cited

UNITED STATES PATENTS

| 2,481,364 | 9/1949 | Strong | 56—25 |
| 2,728,181 | 12/1955 | Carpenter | 56—25 |
| 3,024,545 | 3/1962 | Clark et al. | 56—291 XR |
| 3,242,659 | 3/1966 | Dunlap | 56—25 |

RUSSELL R. KINSEY, Primary Examiner

U.S. Cl. X.R.

56—244, 290